US007916895B2

(12) United States Patent
Johnson (10) Patent No.: US 7,916,895 B2
(45) Date of Patent: Mar. 29, 2011

(54) SYSTEMS AND METHODS FOR IMPROVED TARGET TRACKING FOR TACTICAL IMAGING (75) Inventor: Robert A. Johnson, Pittsford, NY (US)

(73) Assignee: Harris Corporation, Melbourne, FL (US)

(*) Notice: Subject to any disclaimer, the term of this patent is extended or adjusted under 35 U.S.C. 154(b) by 995 days.

(21) Appl. No.: 11/745,170

(22) Filed: May 7, 2007

(65) Prior Publication Data
US 2010/0008539 A1 Jan. 14, 2010

(51) Int. Cl.
*G06K 9/00* (2006.01)
*H04N 5/225* (2006.01)
(52) U.S. Cl. ........................................ 382/103; 348/169
(58) Field of Classification Search .................. 382/103, 382/107; 348/169, 170, 171, 172, 173, 25, 348/154, 155, 208.1, 208.2, 208.14, 208.16, 348/352
See application file for complete search history.

(56) References Cited

U.S. PATENT DOCUMENTS

| 7,158,167 B1 * | 1/2007 | Yerazunis et al. | 348/61 |
| 7,283,647 B2 * | 10/2007 | McNitt | 382/107 |
| 7,650,016 B2 * | 1/2010 | Gold, Jr. | 382/107 |
| 2004/0100563 A1 * | 5/2004 | Sablak et al. | 348/211.4 |

* cited by examiner

*Primary Examiner* — Abolfazl Tabatabai
(74) *Attorney, Agent, or Firm* — McAndrews, Held & Malloy, Ltd.

(57) ABSTRACT

Certain embodiments provide systems and methods for target image acquisition using sensor data. The system includes at least one sensor adapted to detect an event and generate a signal based at least in part on the event. The system also includes an imager obtaining an image of a target and target area based on a target tracking and recognition algorithm. The imager is configured to trigger image acquisition based at least in part on the signal from the sensor. The imager adjusts the target tracking and recognition algorithm based at least in part on sensor data in the signal. In certain embodiments, the imager may also adjust an image acquisition threshold for obtaining an image based on the sensor data.

20 Claims, 8 Drawing Sheets

SYSTEMS AND METHODS FOR IMPROVED TARGET TRACKING FOR TACTICAL IMAGING

BACKGROUND OF THE INVENTION

The present invention generally relates to target tracking systems. More specifically, the present invention relates to systems and methods for improved target tracking for tactical imaging.

Throughout the world, military and homeland security forces face an increasing need to provide safety and security to troops and high value assets. Remote sensor systems are ideal for surveillance and monitoring of high-value assets, such as troop encampments, airfields, base installations, supply routes, and depots. In larger networks, remote sensor systems are used to monitor and protect national borders, regional boundaries, and assets in homeland defense and peacekeeping operations.

Remote sensor systems typically include a network of easily deployed, remotely located sensors that detect the movement of personnel and vehicles. These sensors are typically remote, battery-operated devices that provide commanders with critical surveillance data on a 24-hour basis.

Existing remote sensor systems include several disadvantages. For example, existing remote sensor systems typically flood the network with raw data to be later interpreted at a control station. Additionally, these systems generate a large number of false alarms due to uneventful detections, such as animal movement near the sensors. As another example, existing remote sensor systems are typically designed for a specific application, yet lack sufficient battery life to last the entire mission.

Unmanned imagers must automatically detect targets and capture images of these targets. Target detection is normally determined by observing motion within a field of view of the imager. Loose determination of motion results in images of blowing grass, trees, bushes, dust clouds and similar "false alarms." A tighter definition of motion results in missed targets or a reduced range of the imager. That is, the imager must be emplaced closer to a target area so that small targets appear bigger and, therefore, are easier to track. Thus an imager that can easily track and capture an image of a vehicle at 400 m may have to be deployed at 200 m to capture an image of a person without causing an unacceptable number of false alarms, for example.

Typically, in unmanned imaging systems, power is at a premium, and the imagers are turned off until other sensors detect the presence of a target. Sensors are used to turn on the imager. The imager obtains one or more images or video. Imager output may be combined with acoustic or other sensor output. The imager is used to confirm target presence and provide details on the target that other sensors cannot.

Some systems fuse data from imagers and other sensors to determine more details about the target or to confirm that there is in fact a target. This occurs after the image is captured. Some imaging systems have algorithms to detect and reject motion that occurs in only one place on the image, e.g. a bush blowing on an edge of a frame. However, this does not improve a probability of capturing a small target at range. Additionally, this does not provide an adaptive method for capturing small target images.

Thus, there is a need for systems and methods that take input of sensors that detect a presence of a target and feed that information to an imager to allow the imager to adapt its target tracking and recognition algorithms on a target by target basis. There is a need for systems and methods for improved target tracking for tactical imaging.

BRIEF SUMMARY OF THE INVENTION

Certain embodiments provide a system for target image acquisition using sensor data. The system includes at least one sensor adapted to detect an event and generate a signal based at least in part on the event. The system also includes an imager obtaining an image of a target and target area based on a target tracking and recognition algorithm. The imager is configured to trigger image acquisition based at least in part on the signal from the sensor. The imager adjusts the target tracking and recognition algorithm based at least in part on sensor data in the signal.

In certain embodiments, the imager may adjust an image acquisition threshold for obtaining the image based on the sensor data. In certain embodiments, the imager may identify a presence of a target in the acquired image based at least in part on the sensor data and the target tracking and recognition algorithm.

Certain embodiments provide a method for tactical image acquisition using sensor data. The method includes detecting an event using at least one sensor; generating sensor data from the sensor based at least in part on the event; adjusting a triggering algorithm based at least in part on the sensor data; and triggering an image acquisition using the triggering algorithm.

In certain embodiments, the method may include processing the acquired image data in conjunction with the sensor data. Processing of the acquired image data may be adjusted based on the sensor data, for example. In certain embodiments, the method includes identifying a presence of a target in the image acquisition based at least in part on the sensor data and the triggering algorithm. In certain embodiments, the method includes adjusting an image acquisition threshold based on the sensor data.

Certain embodiments provide a computer readable storage medium including a set of instructions for execution on a computer. The set of instructions includes a sensor routine detecting an event, generating sensor data in response to the event and transmitting the sensor data for use in triggering tactical imaging. The set of instructions also includes an analysis routine analyzing the sensor data based on target type to adjust an image acquisition trigger and/or image acquisition. The set of instructions further includes a trigger routine triggering tactical image acquisition based on the image acquisition trigger.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Certain embodiments provide one or more sensors detecting a presence of a target or other event. Sensor information is then fed to an imager to allow the imager to adapt its target tracking and recognition algorithms on a target by target basis. The imager may use sensor input to facilitate and/or refine its image acquisition. triggering, image acquisition, image processing and/or image data transmission, for example.

Figure 1:
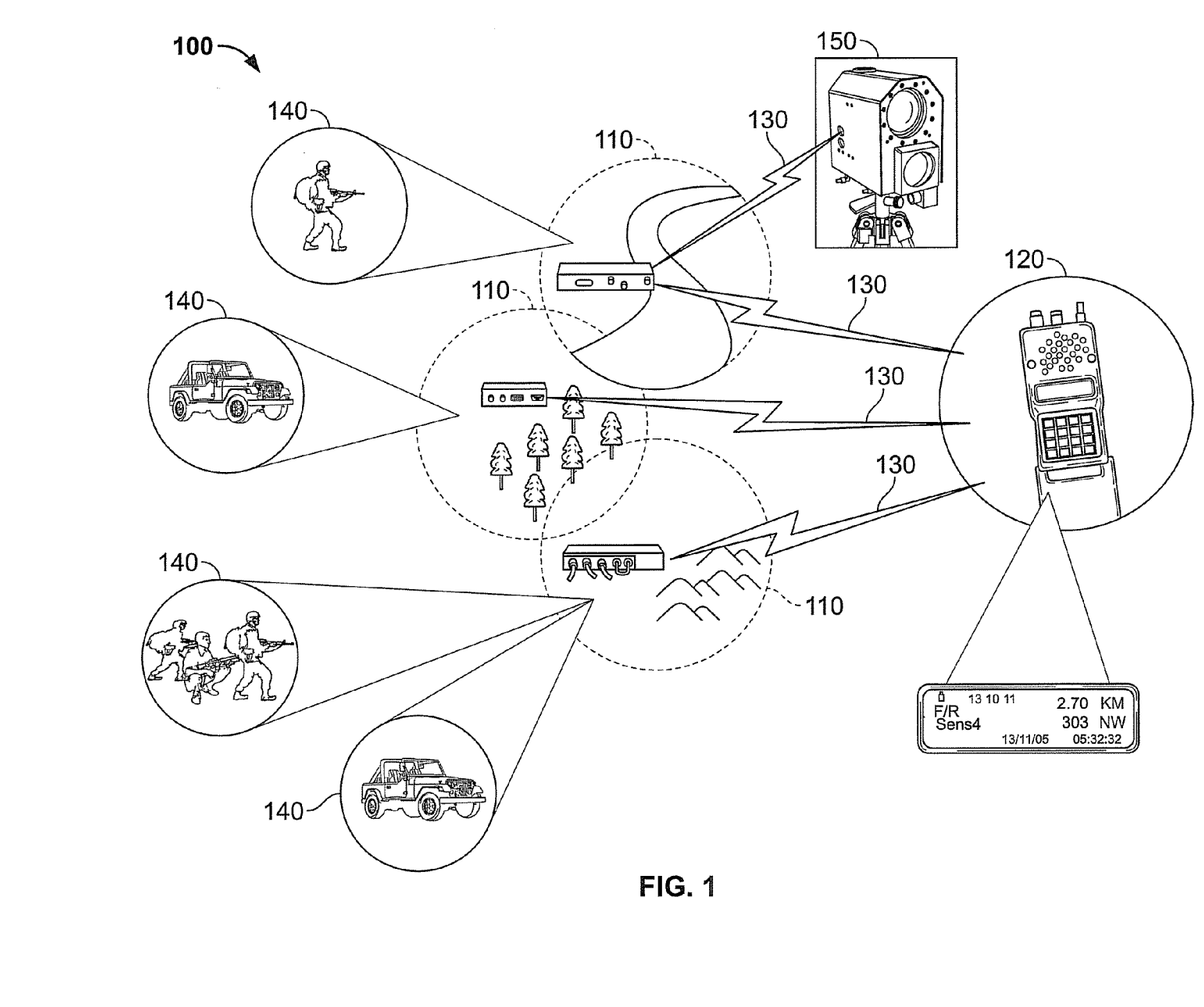
FIG. 1 illustrates an exemplary remote sensor system operating in accordance with an embodiment of the present invention.

FIG. 1 illustrates an exemplary remote sensor system 100 operating in accordance with an embodiment of the present invention. For example, the system 100 may include a RF-5400 sensor system (Harris Corporation, Rochester, N.Y.). The system 100 includes one or more sensor nodes 110, a control center node 120, one or more communication links 130 and an imager 150. In operation, one or more events 140, such as vehicles and personnel, may be detected by sensor nodes 110. For example, sensor node 110 may include a RF-5400VH-SS miniature sensor, a RF-5400VH-MS multiple sensor, and a RF-5400V-SR sensor/relay, as shown in FIG. 1. The events 140 may be communicated to control center node 120, for example, via radio frequency communication links 130. The control center node 120 may include, for example, a Falcon II handheld radio, also shown in FIG. 1. Alternatively and/or in addition, one or more commands (e.g., a command set) may be may be communicated, for example, from the control center node 120 to the sensor node 110, to provide "on the fly" re-configuration of the system 100. Information may also be communicated from sensor node 110 to imager 150 directly and/or indirectly via control center node 120. Information may be communicated to imager 150 to assist the imager 150 in triggering an image acquisition. Information may also be communicated to imager 150 to adjust image acquisition and/or image processing by imager 150, for example.

Figure 2:
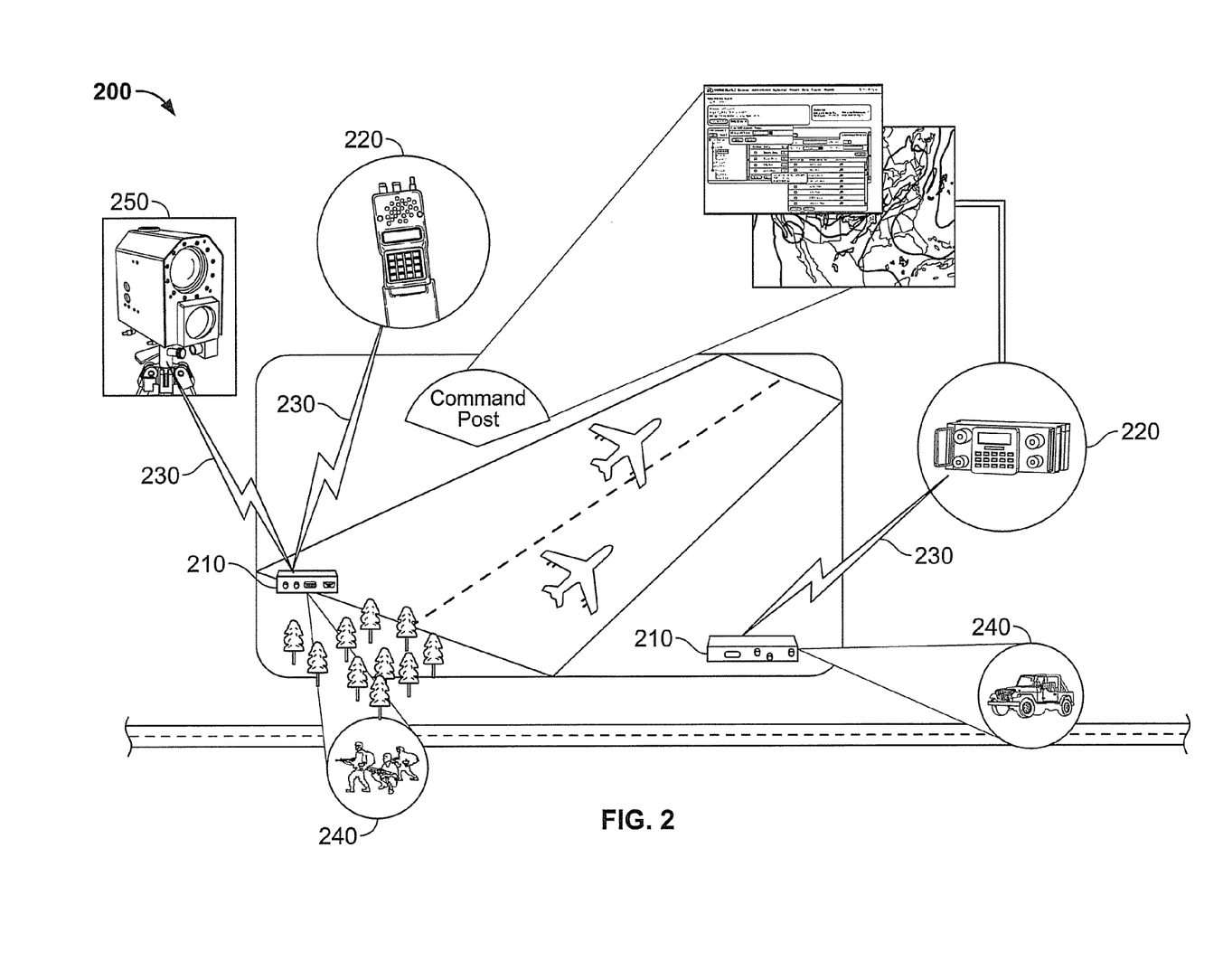
FIG. 2 illustrates an exemplary remote sensor system operating in accordance with an embodiment of the present invention.

FIG. 2 illustrates an exemplary remote sensor system 200 operating in accordance with an embodiment of the present invention. For example, the system 200 may include a RF-5400 sensor system (Harris Corporation, Rochester, N.Y.). The system 200 includes a plurality of sensor nodes 210, a plurality of control center nodes 220, a plurality of communication links 230, and an imager 250. In operation, one or more events 240, such as vehicles and personnel, may be detected by sensor nodes 210. For example, sensor nodes 210 may include a RF-5400VH-SS miniature sensor and an RF-5400V-SR sensor/relay, as shown in FIG. 2. The events 240 may be communicated to control center nodes 220, for example, via radio frequency communication links 230. The control center nodes 220 may include, for example, a Falcon II handheld radio, a RF-5800V-MP manpack radio, a RF-5410 sensor management application, and a RF-6910 situational awareness application, also shown in FIG. 2. Alternatively and/or in addition, one or more commands (e.g., a command set) may be communicated, for example, from the control center nodes 220 to the sensor nodes 210, to provide "on the fly" re-configuration the system 200. Information may also be communicated from sensor node 210 to imager 250 directly and/or indirectly via control center node 220. Information may be communicated to imager 250 to assist the imager 250 in triggering an image acquisition. Information may also be communicated to imager 250 to adjust image acquisition and/or image processing by imager 250, for example.

Figure 3:
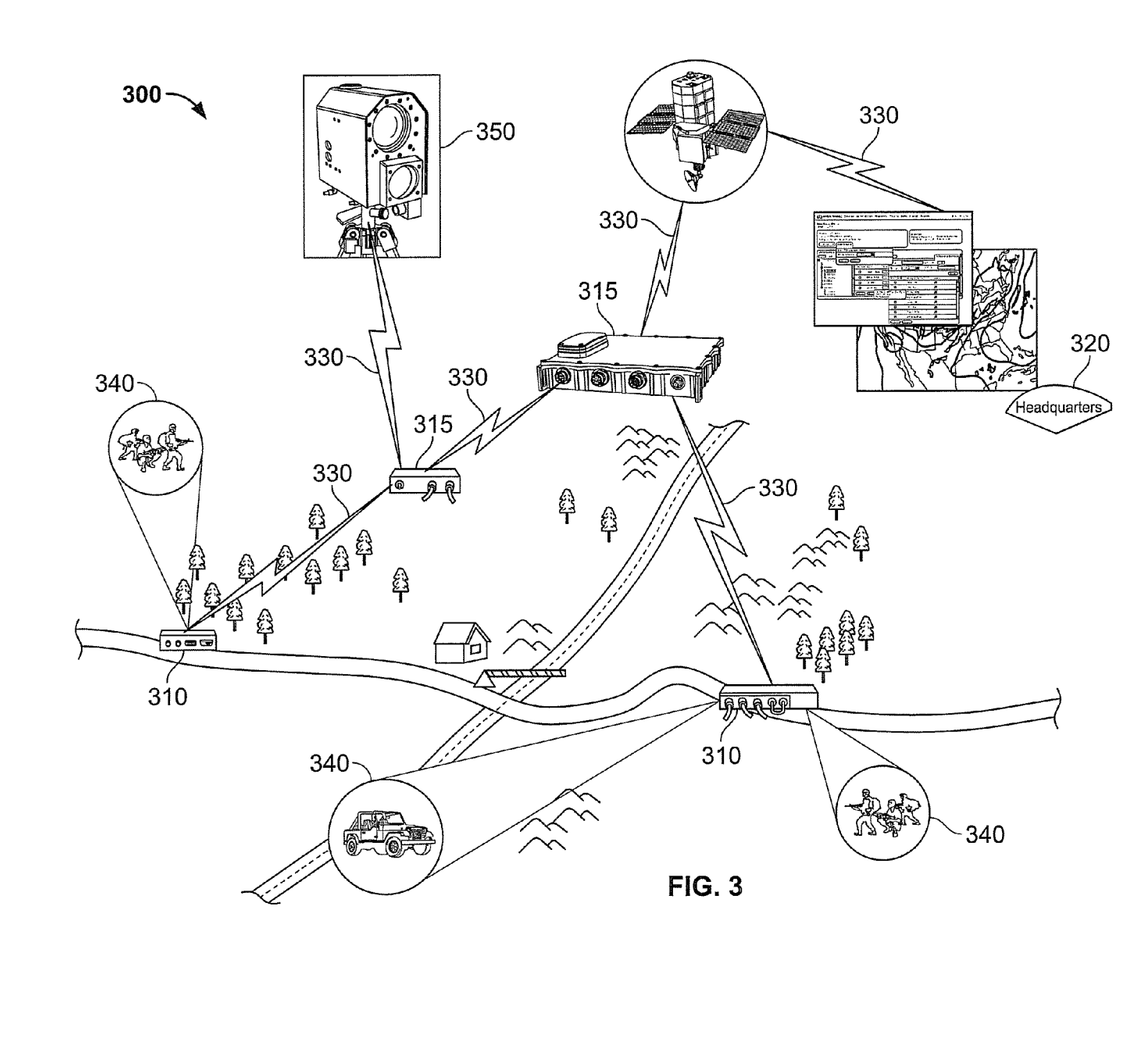
FIG. 3 illustrates an exemplary remote sensor system operating in accordance with an embodiment of the present invention.

FIG. 3 illustrates an exemplary remote sensor system 300 operating in accordance with an embodiment of the present invention. For example, the system 300 may include a RF-5400 sensor system (Harris Corporation, Rochester, N.Y.). The system 300 includes a plurality of sensor nodes 310, a plurality of gateway nodes 315, a control center node 320, a plurality of communication links 330 and one or more imaging nodes 350. In operation, one or more events 340, such as vehicles and personnel, may be detected by sensor nodes 310. For example, sensor nodes 310 may include a RF-5400VH-SS miniature sensor and a RF-5400VH-MS multiple sensor, as shown in FIG. 3. The events 340 may be communicated to gateway nodes 315, for example, via radio frequency communication links 330. The gateway nodes 315 may include, for example, a RF-5400VH-RU relay and a RF-5400VH-GW intelligent gateway, also shown in FIG. 3. The events 340 may be communicated to control center node 320, for example, via satellite communication links 330. The control center node 320 may include, for example, a RF-5410 sensor management application and a RF-6910 situational awareness application, also shown in FIG. 3. Alternatively and/or in addition, one or more commands (e.g., a command set) may be may be communicated, for example, from the control center node 320 to the gateway nodes 315 and/or the sensor nodes 310, to provide "on the fly" re-configuration of the system 300.

In certain embodiments, one or more commands and/or other information may be communicated to imaging node(s) 350 to assist the imaging node(s) 350 in triggering an image acquisition. Information may also be communicated to imaging node(s) 350 to adjust image acquisition, image processing and/or image dissemination by imaging node(s) 350, for example.

Figure 4:
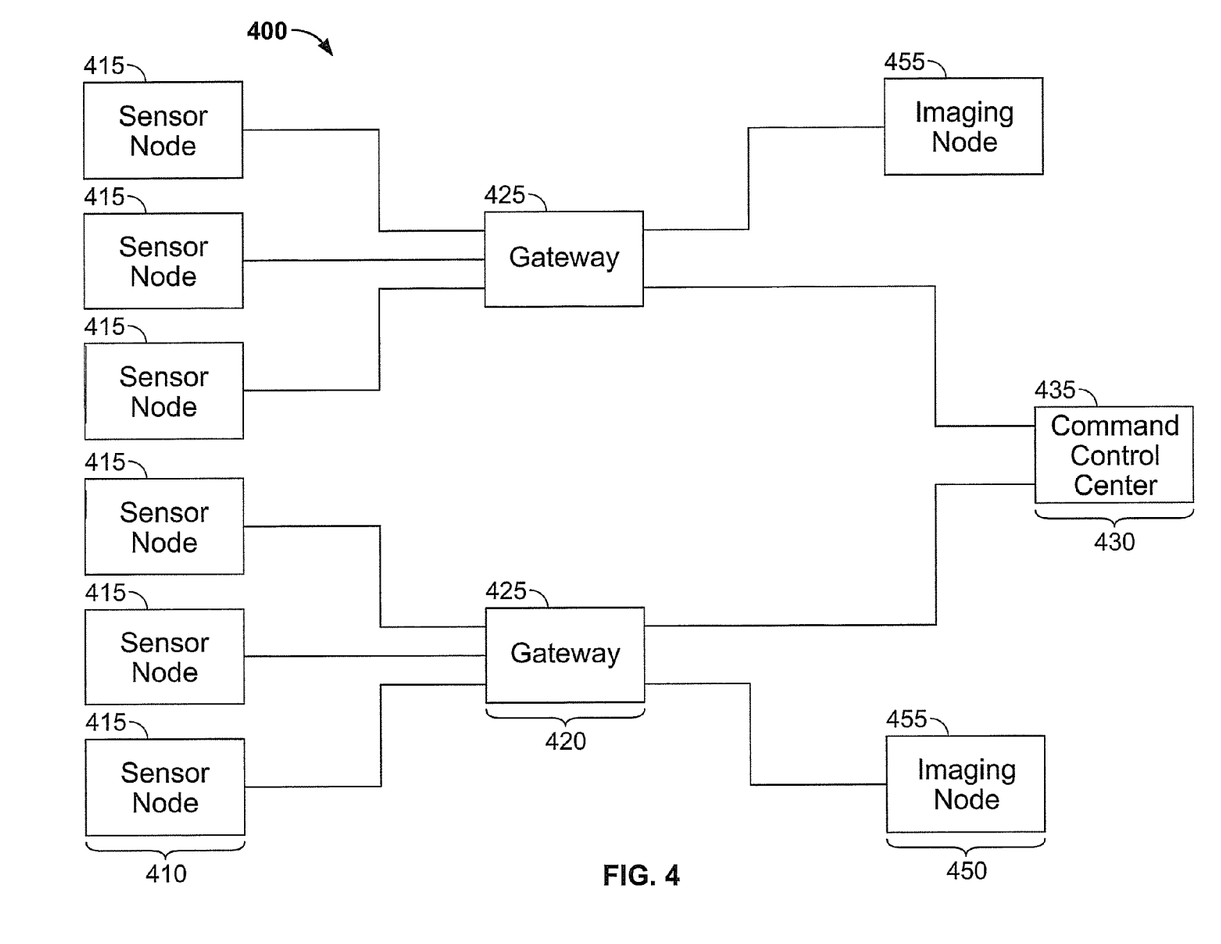
FIG. 4 illustrates a system for improved data communications within a remote sensor system according to an embodiment of the present invention.

FIG. 4 illustrates a system 400 for improved data communications within a remote sensor system according to an embodiment of the present invention. For example, the system 400 may include a RF-5400 sensor system (Harris Corporation, Rochester, N.Y.). The system 400 includes a sensor layer 410, a gateway layer 420, a control center layer 430, and an imaging layer 450 which are described in more detail below.

The sensor layer 410 may include one or more sensor nodes 415. For example, the sensor nodes 415 may include sensors, such as RF-5400VH-SS miniature sensors, RF-5400VH-MS multiple sensors, and/or RF-5400V-SR sensors/relays. The sensor nodes 415 may also include, for example, detectors, such as seismic, acoustic, magnetic, and/or passive infra-red (PIR) detectors.

The gateway layer 420 may include one or more gateway nodes 425. For example, the gateway nodes 425 may include range extenders, such as RF-5400VH-RU relays, RF-5400V-SR sensor/relays, and/or RF-5400VH-GW intelligent gateways.

The control center layer 430 may include one or more control center nodes 435. For example, the control center node 435 may include monitors, such as Falcon II handheld radios, RF-5800V-MP manpack radios, RF-5410 sensor management applications, and/or RF-6910 situational awareness applications.

The imaging layer 450 may include one or more imaging nodes 455. For example, the imaging node 455 may include an imager such as an RF-5408 Falcon Watch Remote Imager.

The sensor layer 410 is in communication with the gateway layer 420 and/or the control center layer 430. For example, as shown in FIG. 4, a plurality of sensor nodes 415 may communicate directly with a gateway node 425 and indirectly with a control center node 435. As another example, the plurality of sensor nodes 415 may communicate directly with the control center node 435.

The gateway layer 420 is in communication with the sensor layer 410 and/or the control center layer 430. For example, as shown in FIG. 4, a gateway node 425 may communicate with a plurality of sensor nodes 415 and a plurality of gateway nodes 425 may communicate with a control center node 435. In certain embodiments, one or more gateway nodes 425 in the gateway layer 420 are in communication with one or more imaging nodes 455 in the imaging layer 450.

The control center layer 430 is in communication with the sensor layer 410, the gateway layer 420 and/or the imaging layer 450. For example, as shown in FIG. 4, a control center node 435 may communicate directly with a plurality of gateway nodes 425 and indirectly with a plurality of sensor nodes 415. The control center node 435 may communicate directly and/or indirectly with one or more imaging nodes 455, for example.

The sensor layer 410 is adapted to detect one or more events. For example, a seismic detector in sensor node 415 may be adapted to detect movement of personnel. As another example, a passive infra-red (PIR) detector in sensor node 410 may be adapted to detect left to right movement of vehicles.

The sensor layer 410 is adapted to generate data based at least in part on one or more events. The data may include, for example, data, signals, events, and/or reports. The data may be stored, for example, in a database. The database may be indexed, for example, based at least in part on network identification (network ID), cluster area, time, classification, direction, global positioning satellite location (GPS location), and/or detection type.

The sensor layer 410 is adapted to process and/or communicate data based at least in part on one or more rules and/or algorithms (e.g., a rule or algorithm set). For example, a plurality of sensor nodes 415 may be adapted to transmit data to a gateway node 425 and/or a control center node 435 based at least in part on a sensor transmission rule. The rule set may include, for example, ordered/unordered events, direction specific events, and/or classification specific events. The rule set may be configured "on the fly", for example, by the system 400 and/or a user of the system 400. The rule set may be configured remotely, for example, from any node in the system 400.

Figure 5:
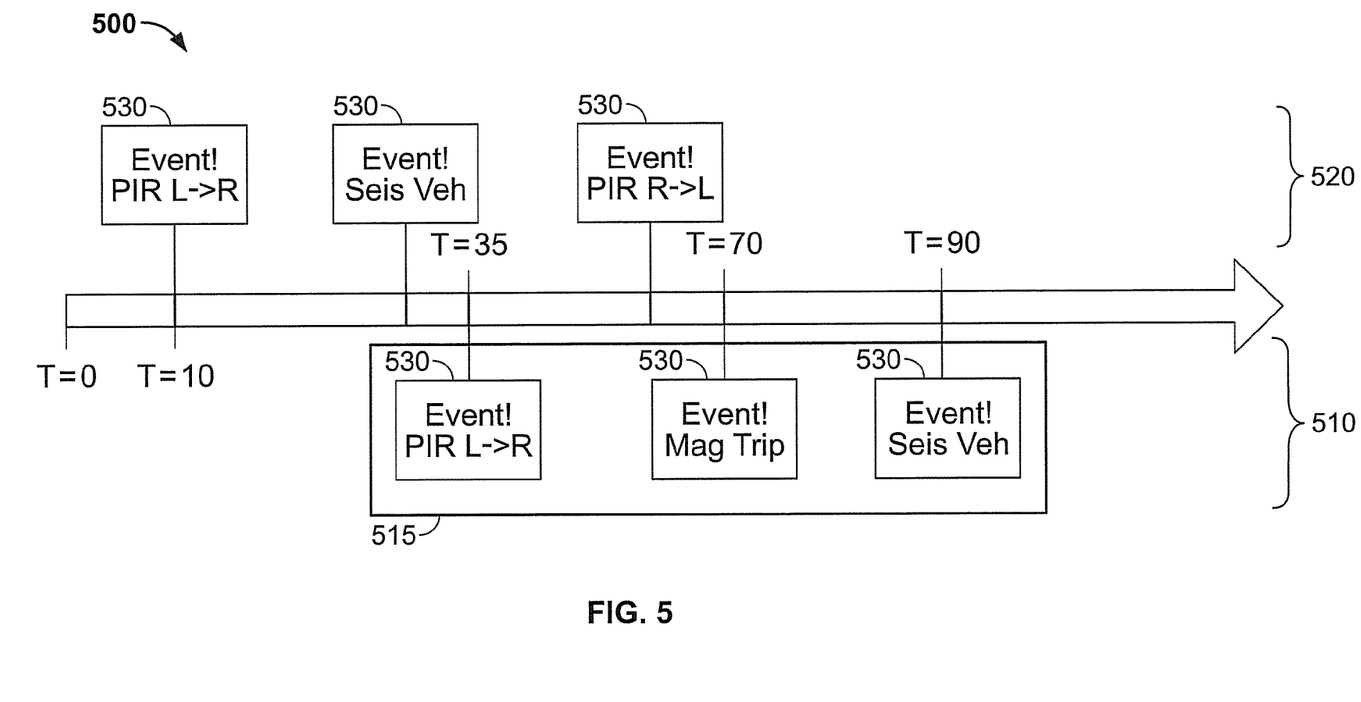
FIG. 5 illustrates an example of a sensor transmission rule operating in accordance with an embodiment of the present invention.

FIG. 5 illustrates an example 500 of a sensor transmission rule operating in accordance with an embodiment of the present invention. The example 500 includes a data transmission sequence 510 and a data hold/drop sequence 520. The data transmission sequence 510 includes a sliding association window 515. The example 500 also includes data 530, which may include, for example, data, signals, events, and/or reports. The example 500 is described with reference to the system 400 of FIG. 4, but it should be understood that other implementations are possible.

In operation, the data 530 is compared to the sensor transmission rule. If the rule is satisfied, then the data 530 may be communicated. Alternatively and/or in addition, a single event corresponding to the rule may be transmitted to reduce the amount of data transmitted and still indicate that the rule has been satisfied. Conversely, if the rule is not satisfied, then the data 530 may be held and/or dropped. Rules may be used for triggering an imaging camera, for example. For example, if a sensor indicates that a target is traveling out of an imager field of view, then imager camera may not be turned on.

As an example, RULE X may be configured by a user to be a combination of EVENT A, EVENT B, and EVENT C in the order of A>C>B within 60 seconds, where EVENT A includes passive infra-red (PIR) detection of a relative left to right moving target, EVENT B includes seismic detection of any classification, and EVENT C includes magnetic "tripwire" detection. The data 530 in the sliding association window 515 of the data transmission sequence 510 satisfies RULE X, and consequently, may be transmitted, for example, from a sensor node 415 to a gateway node 425, imager node 455, and/or a control center node 435. Alternatively and/or in addition, a single event corresponding to RULE X may be transmitted to reduce the amount of data transmitted and still indicate that RULE X has been satisfied. Conversely, the data 530 in the data hold/drop sequence 520 does not satisfy RULE X, and consequently, may be held and/or dropped. For example, if RULE X is not satisfied, then a camera at imaging node 455 may not be triggered for image acquisition.

Although the data transmission sequence 510 is described with reference to a single sliding association rule 515, it should be understood that one or more sliding association windows 515 are possible. For example, if a second start condition is present, such as EVENT A, then a second sliding association window 515 may be started. If EVENT C and then EVENT B follow within 60 seconds of EVENT A, then RULE X is satisfied and the data 530 in the second sliding association window 515 may be transmitted, for example, from the sensor node 415 of FIG. 4 to a gateway node 425, a control center node 435 and/or an imager node 455. Conversely, if EVENT C and then EVENT B do not follow within 60 seconds of EVENT A, then RULE X is not satisfied, the second sliding window 515 may be closed, and the data 530 in the second sliding association window 515 may be held and/or dropped.

The gateway layer 420 is adapted to process and/or communicate data based at least in part on one or more rules and/or algorithms (e.g., a rule or algorithm set). For example, a gateway node 425 may be adapted to receive data from one or more sensor nodes 415 and transmit the data to a control center node 435 and/or an imaging node 455 based at least in part on a gateway transmission rule. The rule set may include, for example, ordered/unordered events, node identification (node ID) based events, and/or report type based events. The rule set may be configured "on the fly", for example, by the system 400 and/or a user of the system 400. The rule set may be configured remotely, for example, from any node in the system 400.

The imaging layer 450 is adapted to trigger image acquisition, acquire one or more images, and/or analyze one or more acquired images based on received data and one or more rules and/or algorithms. For example, an imager node 455 may be adapted to receive information from a gateway node 425 to assist in triggering an image acquisition at the imager node 455. Information may also be used to assist the imaging node 455 in image acquisition and/or analysis, for example. Rules and/or algorithms used in image triggering, acquisition, analysis, etc., may be preset at the imaging node 455 and/or imaging layer 450, transmitted from a gateway node 425, etc.

Figure 6:
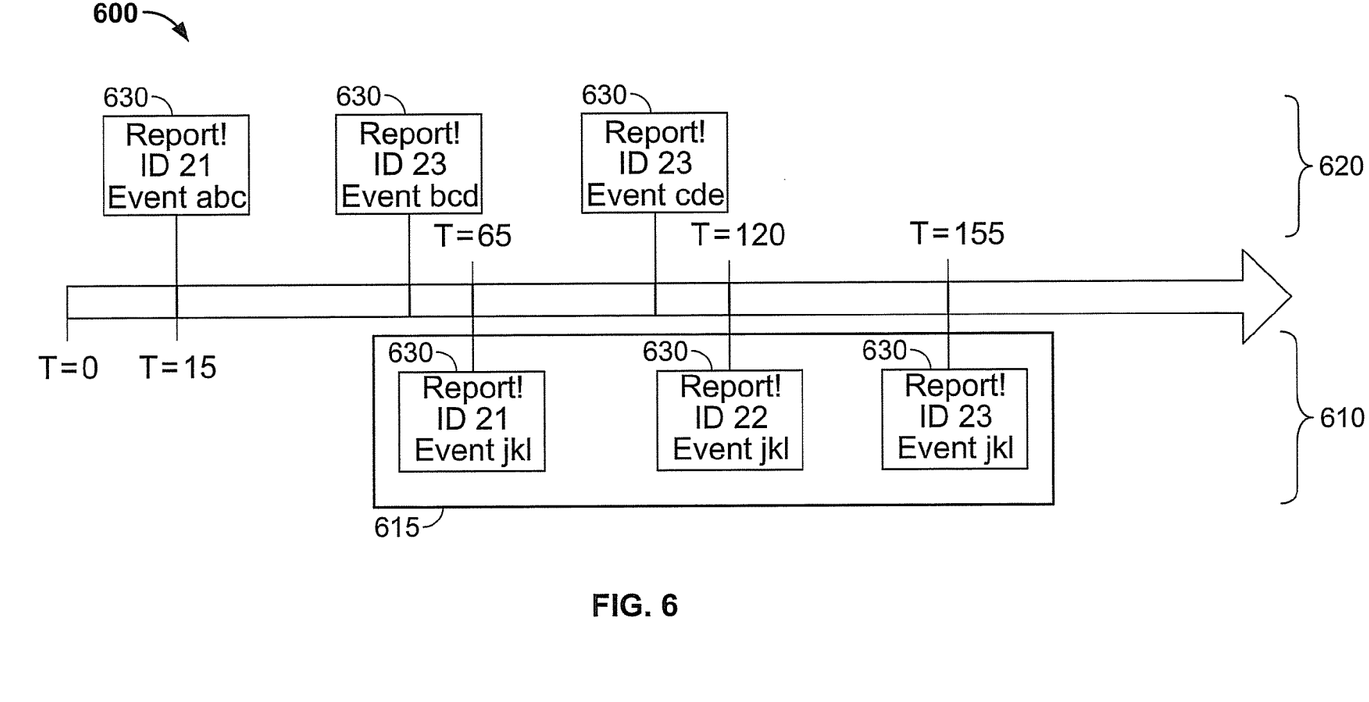
FIG. 6 illustrates an example of a gateway transmission rule operating in accordance with an embodiment of the present invention.

FIG. 6 illustrates an example 600 of a gateway layer rule operating in accordance with an embodiment of the present invention. The example 600 includes a data transmission sequence 610 and a data hold/drop sequence 620. The data transmission sequence 610 includes a sliding association window 615. The example 600 also includes data 630, which may include, for example, data, signals, events, and/or reports.

In operation, the data 630 is compared to the sensor layer rule. If the rule is satisfied, then the data 630 may be transmitted. Alternatively and/or in addition, a single event corresponding to the rule may be transmitted to reduce the amount of data transmitted and still indicate that the rule has been satisfied. Conversely, if the rule is not satisfied, then the data 630 may be held and/or dropped.

For example, RULE Y may be configured by a user to include a combination of SENSOR NODE 21, SENSOR NODE 22, and SENSOR NODE 23, each sensor node reporting identical events in the order 21>22>23 within 180 seconds. The data 630 in the sliding association window 615 of the data transmission sequence 610 satisfies RULE Y, and consequently, may be transmitted, for example, from a gateway node 425 to a control center node 435 and/or an imager node 455. Alternatively, a single event corresponding to RULE Y may be transmitted to reduce the amount of data transmitted and still indicate that RULE Y has been satisfied. Conversely, the data 630 in the data hold/drop sequence 620 does not satisfy RULE Y, and consequently, may be held and/or dropped.

Although the data transmission sequence 610 is described with reference to a single sliding association rule 615, it should be understood that one or more sliding association windows 615 are possible. For example, if a second start condition is present, such as SENSOR NODE 21 reporting an event, then a second sliding association window 615 may be started. If SENSOR NODE 22 and then SENSOR NODE 23 report the same event within 180 seconds, then RULE Y is satisfied, and consequently, the data 630 in the second sliding association window 615 may be transmitted, for example, from a gateway node 425 to a control center node 435 and/or imager node 455. For example, the data 630 satisfying RULE Y may be transmitted to an imager node 455 to affect triggering of the imager to acquire a target image. Conversely, if SENSOR NODE 22 and then SENSOR NODE 23 do not report the same event within 180 seconds, then RULE Y is not satisfied, the second sliding association window 615 may be closed, and the data 630 in the second sliding association widow 615 may be held and/or dropped.

The control center layer 430 is adapted to notify a user based at least in part on one or more rules and/or algorithms (e.g., a rule or algorithm set). For example, a control center node 435 may receive data from a plurality of sensor nodes 415 and/or a plurality of gateway nodes 425 and automatically alert a user when the data matches a pattern recognition template. The rule set may include, for example, ordered/ unordered events and/or analog/digital signatures. The rule set may be implemented using a sliding association window, as described above. The rule set may be configured "on the fly", for example, by the system 400 and/or a user of the system 400. The rule set may be configured remotely, for example, from any node in the system 400.

For example, a user may create a pattern recognition template that matches on relative left to right movement of a vehicle reported first from SENSOR NODE A and then from SENSOR NODE B within 5 minutes. The control center layer 430 may query a database and alert the user when the data in the database matches the pattern recognition template. For example, the control center layer 430 may alert the imaging layer 450 when the data matches the pattern recognition template to trigger an image acquisition, identify a target in an acquired image, etc.

The rule set may be run continuously or periodically (e.g., daily, hourly, etc.) depending on the particular application of the system 400, such as force protection, perimeter surveillance, and/or remote boarder monitoring.

As discussed above, the components, elements, and/or functionality of the system 400 may be implemented alone or in combination in various forms in hardware, firmware, and/ or as a set of instructions in software, for example. Certain embodiments may be provided as a set of instructions residing on a computer-readable medium, such as a memory, hard disk, DVD, or CD, for execution on a general purpose computer or other processing device.

Figure 7:
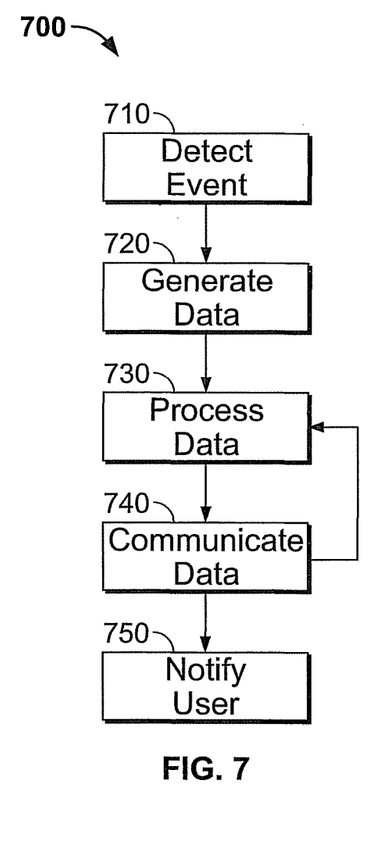
FIG. 7 illustrates flow diagram for a method for improved data communications within a remote sensor system according to an embodiment of the present invention.

FIG. 7 illustrates a flow diagram for a method 700 for improved data communications within a remote sensor system according to an embodiment of the present invention. The method 700 includes the following steps, which are described in more detail below. At step 710, an event is detected. At step 720, data is generated. At step 730, the data is processed. At step 740, the data is communicated. At step 750, a user is notified. The method 700 is described with reference to the components of the system 400 of FIG. 4, but it should be understood that other implementations are possible.

At step 710, an event is detected, for example, by a sensor node, such as sensor node 415. The event may include, for example, left to right vehicle movement detected by a passive infra-red (PIR) detector.

At step 720, data is generated based at least in part on the event. For example, the left to right vehicle movement detected by the passive infra-red (PIR) detector may be reported in a database.

At step 730, the data is processed based at least in part on a rule. For example, if the rule is satisfied (e.g., the data matches the rule), then the data may be transmitted. Conversely, for example, if the rule is not satisfied (e.g., the data does not match the rule), then the data may be held and/or dropped. The rule may include, for example, a sensor transmission rule, a gateway transmission rule, and/or a control center notification rule.

At step 740, the data is communicated. For example, the data may be transmitted by the sensor node and received by a gateway node, such as gateway node 425, a control center node, such as control center node 435, and/or an imager node, such as imager node 455. As another example, the data may be transmitted by the gateway node and received by the imager node and/or control center node.

In certain embodiments of the present invention, the data may be communicated when the rule is satisfied. For example, the data may be transmitted from the sensor node to the gateway node and/or the control center node when a sensor transmission rule is satisfied. As another example, the data may be transmitted from the gateway node to the control center node when a gateway rule is satisfied.

At step 750, a user is notified when a rule is satisfied. For example, an imager may be automatically alerted when data in a database matches a pattern recognition template in order to trigger acquisition of an image.

One or more of the steps 710-750 of the method 700 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Figure 8:
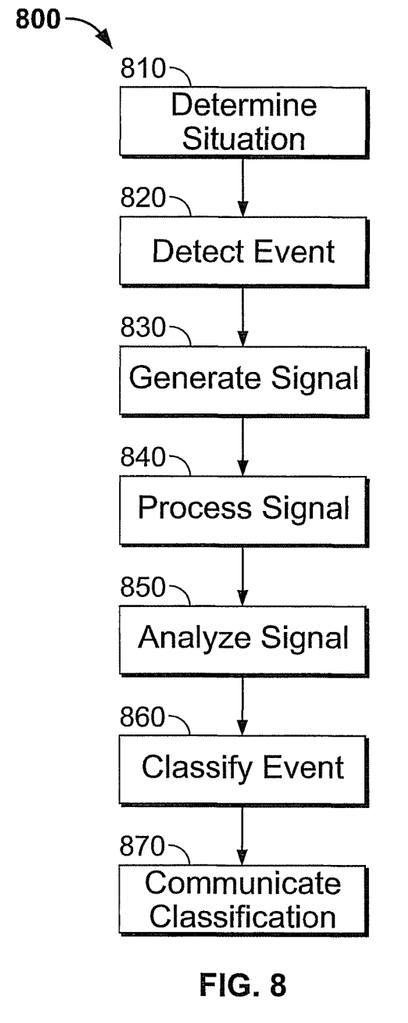
FIG. 8 illustrates a flow diagram for a method for improved signal processing within a remote sensor system according to an embodiment of the present invention.

FIG. 8 illustrates a flow diagram for a method 800 for improved signal processing within a remote sensor system according to an embodiment of the present invention. The method 800 includes the following steps, which are discussed in more detail below. At step 810, a situation is determined. At step 820, an event is detected. At step 830, a signal is generated. At step 840, the signal is processed. At step 850, the signal is analyzed. At step 860, the event is classified. At step 870, the event is communicated.

At step 810, a situation is determined. For example, the situation may include a target type, an environment or environmental condition, and/or a dynamic environment or a dynamic environmental condition.

At step 820, an event is detected. For example, a vehicle may be detected by a seismic detector. At step 830, a signal is generated based at least in part on the event. For example, the seismic detector may generate an electrical signal from the seismic vibrations of the vehicle.

At step 840, the signal is processed. The signal may include, for example, the signal generated at step 830. In certain embodiments of the present invention, the signal may be processed based at least in part on the situation. In certain embodiments of the present invention, the signal may be processed to determine a signal envelope. The signal envelope may be further processed based at least in part on the situation.

At step 850, the signal is analyzed. The signal may include, for example, the signal generated at step 830 and/or the signal processed at step 840. In certain embodiments of the present invention, the signal and/or the signal envelope may be analyzed, for example, in one or more domains. In certain embodiments of the present invention, the signal envelope may be analyzed based at least in part on the situation.

At step 860, an event is classified. For example, an impulse source may be classified as a person, whereas a constant source may be classified as a vehicle.

At step 870, the classification is communicated. For example, event classification may be communicated to an imager to assist in triggering an image acquisition based on one or more rules and/or algorithms, for example. As another example, event classification may be communicated to an imager to assist in processing of image data from an acquired image to, for example, assist in identifying a target in the image.

One or more of the steps 810-870 of the method 800 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

As discussed above, input from one or more sensors may be provided to an imaging sensor to perform better. Sensor input (and additional processing according to one or more rules, algorithms, criteria, etc.) may be used by an imager to trigger image acquisition, perform an image acquisition, analyze or otherwise process an image, and/or transmit image and/or analysis data, for example.

In certain embodiments, an imager may be used with one or more sensors in conjunction with one or more sensor trigger rules, such as the rules described above, to obtain image(s) and/or video of a target. Information that may be passed from sensor(s) or detector(s) to the imager include targets direction (e.g. left to right), target classification (e.g. heavy or light vehicle or personnel), time of day (provides guide to emphasize use of day camera or night camera), ambient temperature, solar load (both can be used to set thresholds in thermal/infrared camera), etc.

In certain embodiments, an imager system 900 (shown in FIG. 9) includes a plurality of components, such as target detector(s) 935 and sensor subsystem(s) 930, a central node 920 for collecting detector/sensor information, and an imager 910. The system 900 may also include one or more nodes 940 interfacing between a sensor 930 and/or detector 935 subsystem and the central node 920.

Figure 9:
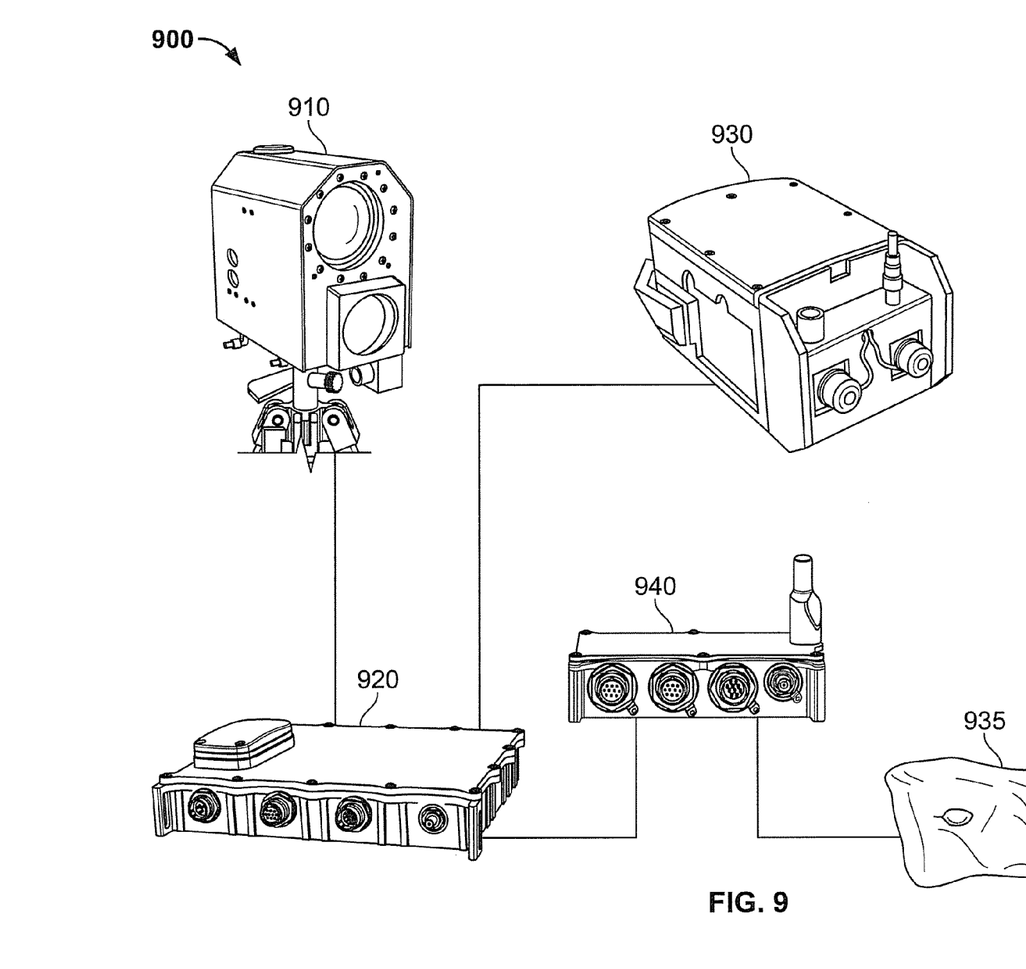
FIG. 9 illustrates an imager system including remote sensors in accordance with an embodiment of the present invention.

Sensor information relevant to the imager for improving detection of a specific target at a specific time of day is provided to the imager 910. Such information improves a probability of detection while helping to maintain a low false alarm rate.

In certain embodiments, sensitivity of the imager is improved while maintaining a low false alarm rate. Data available from sensors already deployed is used for the purpose of cueing or triggering the imager. Additional sensors may or may not be used to improve triggering accuracy. For example, the imager 910 performs data fusion or aggregation in the field (e.g., in a hostile environment) and thus increases a probability of detection and reduces false alarms and wasted bandwidth.

In certain embodiments, an unattended ground sensor system 930, 935 with the imager 910 attempts to increase a probability of capturing images of targets while helping to maintain a low false alarm rate using available cueing sensor and/or other sensor information to improve imager algorithm performance on a target by target basis. Certain embodiments provide systems that help enhance their imager false alarm (e.g., a picture with no valid targets) performance by using the cueing sensor input to allow the imager 910 to determine when to ignore signatures that are moving in a wrong direction and/or are of a wrong size, for example.

In certain embodiments, an imager 910 or other camera may be configured to look for a person or other small target, moving left to right, for example. From sensor 930, 935 data, a direction of movement is known, so the imager 910 can ignore small objects moving a different direction.

If an object or "blob" meets one or more trigger criteria but is then broken up, the imager 910 may continue to track the blob because the object meets some of the prescribed criteria. The imager 910 and/or sensors 930, 935 may continue to track the blob for a certain predefined period of time, for example. The period of time may be the same and/or may vary according to the trigger criteria.

Any number of sensors 930, 935, such as target detectors (e.g., trip wires, infrared beam breaks, acoustic sensors (e.g., listening for vehicle and/or human sounds), seismic sensors (e.g., detecting vibration), pressure sensors, magnetic sensors (e.g., detecting presence of weapons, vehicles, etc. due to metal content), laser (e.g., a laser rangefinder), radar, etc.) and/or other environment sensors, may be used to provide trigger data to the imager 910. Improved sensor data, combination of sensor data and/or use of sensor data help to reduce a probability of obtaining and analyzing a bad picture while helping to improve a probability of imaging a small target. In certain embodiments, for example, one or more sensors 930, 935 identify a blob moving across an area based on sensor data, and ignore a blob swaying back and forth, to trigger target image acquisition.

In operation, seismic and/or acoustic sensors can detect a person or vehicle moving in range, for example. An infrared beam break can provide a direction of movement, for example. That information (e.g., a person moving left to right) is transmitted to the imager 910 directly and/or via node 920 and/or 940. The imager 910 adjusts one or more imaging trigger thresholds to look for that target before obtaining an image.

The imager 910 adjusts thresholds of operation according to type of target and direction of motion or bearing of the target, for example. Target speed may also be determined and used in adjusting imager 910 operation. Several parameters or thresholds may be adjusted at the imager 910 and/or sensor 930, 935 to obtain data to trigger target imaging. If the target is a vehicle, the imager 910 can ignore smaller blobs, for example. If the target is a person, a smaller size threshold may be set. An amount of light (e.g., day or night (infrared)) may be used to determine an imager 910 type (e.g., day camera vs. night or infrared camera) or setting to obtain a target image, for example.

In certain embodiments, the imager 910 includes a radio or other receiver or transceiver to directly receive reports from sensors 930, 935. In certain embodiments, a device, such as node 920, may be connected to the imager 910 to receive sensor reports via radio or other medium and then activate the imager 910 in response to the sensor data. Pictures and/or video from the imager 910 may then be sent back to the device which transmits the image data via satellite, radio and/or other communication mechanism to a back end processing system, for example.

In certain embodiments, sensor data can also be reported to a back end processing system and/or other end user. In certain embodiments, sensor and/or other data may be transmitted by the imager 910 in an image header and/or metadata, for example. For example, a picture header may specify an outline of a box to go around a target in the image to identify what the camera interprets as a usable image of the blob or target.

In certain embodiments, imager parameters are adjustable. Imager parameters may be adjustable automatically by the imager 910 during operation as a result of sensor input, image data and/or other feedback, for example. In certain embodiments, imager parameters may be adjusted externally by an operator or user.

As discussed above, the components, elements, and/or functionality of the system 900 may be implemented alone or in combination in various forms in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Figure 10:
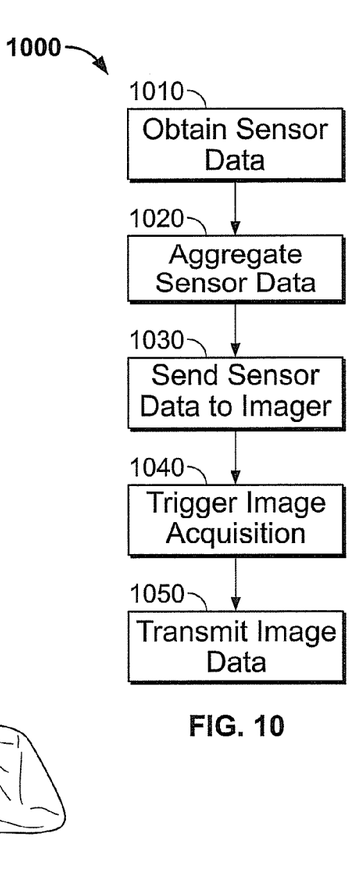
FIG. 10 illustrates a flow diagram for a method for target acquisition according to an embodiment of the present invention.

FIG. 10 illustrates a flow diagram for a method 1000 for target acquisition according to an embodiment of the present invention. At step 1010, sensor/detector data is obtained. For example, infrared beam data is obtained indicating that a target is moving from left to right. At step 1020, data is aggregated. For example, a seismic and/or acoustic sensor detects a person moving within range and an infrared beam break provides a direction of movement to provide evidence of a target moving from left to right.

At step 1030, aggregated sensor data is sent to an imager. For example, radios and/or other transmitters in the seismic and/or acoustic sensors transmit data to the imager and/or an interface node in communication with the imager. Alternatively and/or in addition, one or more sensors may communicate with an intermediary node to relay data between the sensor(s) and the imager, directly and/or via an interface node, for example.

At step 1040, image acquisition is triggered based on the sensor data. For example, the imager uses the received sensor data to adjust an image threshold or trigger and/or other imager parameters to help ignore non-target objects (e.g., swaying bushes or grass) while identifying an intended image target (e.g., a person walking in a field). The threshold or trigger helps the imager optically track the target and gather evidence, such as one or more images and/or video, to provide target information to a back end system and/or other end user, for example. Sensor data helps the imager to adjust a target tracking and recognition algorithm, for example, to determine when to ignore other objects (e.g., moving in a direction different from that indicated by the sensor data, of the wrong size, etc.) and still capture image data of the desired target.

As an example, from a sensor like a radar or a laser rangefinder, range data may be provided to an imager and, based on the range and a target classification, the imager may estimate an expected size of the target (e.g., a number of pixels) in its image frame and adjust target tracking and/or detection algorithms appropriately. Bearing information, for example, may also be used to adjust target tracking and/or detection algorithms.

At step 1050, acquired image data (e.g., still and/or video) is transmitted to an external system. For example, data is transmitted to a computer for processing and further use of the image data for identification, targeting, etc.

One or more of the steps 1010-1050 of the method 1000 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Thus, certain embodiments provide improved target tracking for tactical imaging. Certain embodiments combine tracking data from one or more sensors to adjust an imager acquisition algorithm on a target-by-target basis. Certain embodiments provide a technical effect of an improve, adaptive image triggering system and/or method for target tracking and tactical imaging.

Several embodiments are described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. As noted above, the embodiments of the present invention may be implemented using an existing computer processor, or by a special purpose computer processor incorporated for this or another purpose or by a hardwired system.

As noted above, certain embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Certain embodiments of the invention are described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Certain embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, handheld devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

Those skilled in the art will appreciate that the embodiments disclosed herein may be applied to the formation of a variety of sensor and imaging systems. Certain features of the embodiments of the claimed subject matter have been illustrated as described herein, however, many modifications, substitutions, changes and equivalents will now occur to those skilled in the art. Additionally, while several functional blocks and relations between them have been described in detail, it is contemplated by those of skill in the art that several of the operations may be performed without the use of the others, or additional functions or relationships between functions may be established and still be in accordance with the claimed subject matter. It is, therefore, to be understood that the appended claims are intended to cover all such modifications and changes as fall within the true spirit of the embodiments of the claimed subject matter.

The invention claimed is:

1. A system for target image acquisition using sensor data, said system comprising:
   at least one sensor configured to detect an event and generate a signal based at least in part on the event; and
   an imager operable to obtain an image of a target and target area based on a target tracking and recognition algorithm, said imager configured to trigger image acquisition based at least in part on said signal from said sensor, said imager operable to adjust said target tracking and recognition algorithm prior to obtaining said image of said target and target area based at least in part on sensor data in said signal.

2. The system of claim 1, wherein said at least one sensor comprises at least one of a seismic sensor, an infrared beam detector, a magnetic sensor, a pressure sensor, a laser, a radar and an acoustic sensor.

3. The system of claim 1, wherein said event comprises at least one of a target direction, target speed, number of targets, target type classification and an amount of light.

4. The system of claim 1, wherein said imager adjusts said target tracking and recognition algorithm based on a plurality of sensor data from a plurality of sensors, said plurality of sensor data corresponding to a plurality of events.

5. The system of claim 1, further comprising an interface device configured to aggregate sensor data for relay to said imager.

6. The system of claim 1, further comprising an interface device connected with said imager, said interface device operable to receive said signal from said sensor and relay sensor data in said signal to said imager.

7. The system of claim 1, wherein said at least one sensor and said imager further include a radio for communicating data.

8. The system of claim 1, further comprising a back-end processor receiving and processing said image data and said sensor data.

9. The system of claim 1, wherein said imager identifies presence of a target in said acquired image based at least in part on said sensor data and said target tracking and recognition algorithm.

10. The system of claim 1, wherein said imager adjusts an image acquisition threshold for obtaining said image based on said sensor data.

11. A method for tactical image acquisition using sensor data, said method comprising:
    detecting an event using at least one sensor;
    generating sensor data from said sensor based at least in part on said event;
    adjusting a triggering algorithm based at least in part on said sensor data prior to obtaining an image related to said event; and
    triggering an image acquisition using said triggering algorithm.

12. The method of claim 11, wherein said event comprises at least one of a target direction, target speed, number of targets, target type classification, target range, and an amount of light.

13. The method of claim 11, wherein said step of adjusting further comprises adjusting said triggering algorithm based on a plurality of sensor data from a plurality of sensors, said plurality of sensor data corresponding to a plurality of events.

14. The method of claim 11, further comprising processing said acquired image data in conjunction with said sensor data.

15. The method of claim 14, further comprising adjusting of said processing of said acquired image data based on said sensor data.

16. The method of claim 11, further comprising identifying presence of a target in said image acquisition based at least in part on said sensor data and said triggering algorithm.

17. The method of claim 11, wherein said step of adjusting further comprises adjusting an image acquisition threshold based on said sensor data.

18. A non-transitory computer readable storage medium including a set of instructions for execution on a computer, said set of instructions comprising:
    a sensor routine configured to detect an event, generate sensor data in response to said event and transmit said sensor data for use in triggering tactical imaging;
    an analysis routine configured to analyze said sensor data based on target type to adjust at least one of an image acquisition trigger and an image acquisition prior to obtaining an image related to said event; and
    a trigger routine configured to trigger tactical image acquisition based on said image acquisition trigger.

19. The non-transitory computer readable medium of claim 18, wherein said event comprises at least one of a directional movement, an amount of light and a target type classification.

20. The non-transitory computer readable medium of claim 18, wherein said analysis routine adjusts said image acquisition trigger based on a plurality of sensor data from a plurality of sensors, said plurality of sensor data corresponding to a plurality of events.

\* \* \* \* \*